Inventor
Yoshitsugu Hamada
By Stevens, Davis, Miller & Mosher
Attorneys

United States Patent Office 3,259,113
Patented July 5, 1966

---

3,259,113
ROTARY DIESEL ENGINES
Yoshitsugu Hamada, Nishinomiya-shi, Japan, assignor to Yanmar Diesel Engine Co., Ltd., Osaka, Japan, a corporation of Japan
Filed June 5, 1962, Ser. No. 200,172
Claims priority, application Japan, Aug. 16, 1961, 36/29,062
2 Claims. (Cl. 123—8)

The present invention relates to rotary machines and particularly to rotary machines of the so-called planetary revolution type.

Rotary machines of the type described for use as an internal-combustion engine generally employ a generally polygonal rotor journaled in a housing, having an inner peripheral wall surface of generally multi-lobe epitrochoidal and usually double-lobe epitrochoidal contour, eccentrically with respect to the axis of said housing, said rotor being rotatable with its edges in continuous sliding contact with said inner peripheral surface. With this type of internal-combustion engine, where a clearance is required between the inner peripheral wall of the housing and the outside surface of the rotor, it is rather difficult to obtain a desired compression ratio particularly with a rotary, internal combustion engine of rather small size, since the volume of the working chamber when the compression therein is at a maximum with the rotor lying at its upper dead point is noticeably large as compared with that of a reciprocating piston type internal-combustion engine.

The present invention has for its object to make it easy to obtain a high compression ratio as required with the diesel cycle.

To this end, the present invention employs a single-lobe epitrochoidal type rotary machine and a double-lobe epitrochoidal type rotary machine juxtaposed thereto, the former acting as a compressor and the latter acting as an internal combustion engine, for the purpose of readily obtaining a desired compression ratio by two-stage compression.

With the diesel engine, in which combustion gases formed by the compression ignition of the gaseous mixture expand to do external work, the expansion of the combustion gases cannot be effected efficiently and in full with the apparatus alone, and thus any high thermal efficiency cannot be realized which is characteristic of diesel engines.

In such cases, it is required that the high-temperature high-pressure exhaust gases which have not fully expanded yet be utilized in a separate volumetric type or speed type engine for the recovery of the energy contained in the exhaust. Accordingly, it is a primary feature of the inventive apparatus to combine a separate re-expanding machine therewith.

The present invention will now be described with reference to the accompanying drawings.

Figure 1:
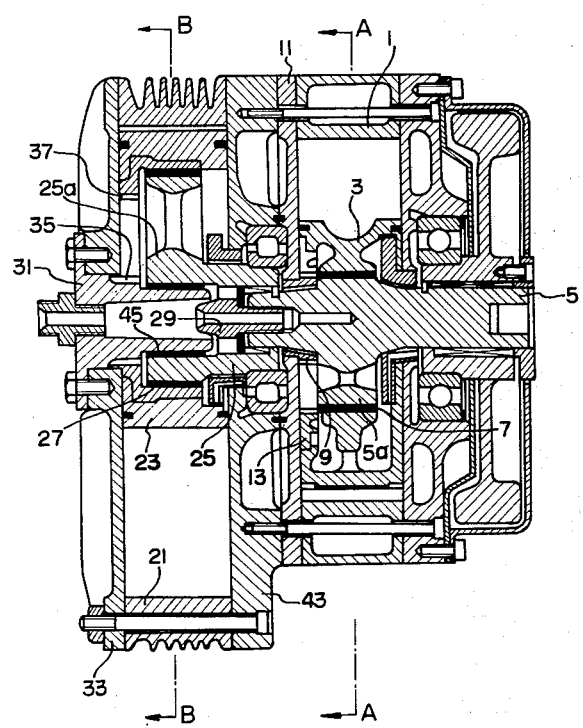
FIG. 1 is a vertical cross section of the engine embodying the present invention.
Figure 2:
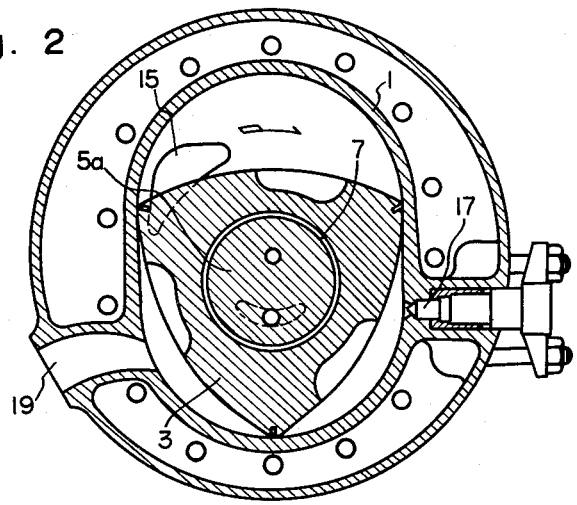
FIG. 2 is a cross section taken along the line A—A in FIG. 1.
Figure 3:
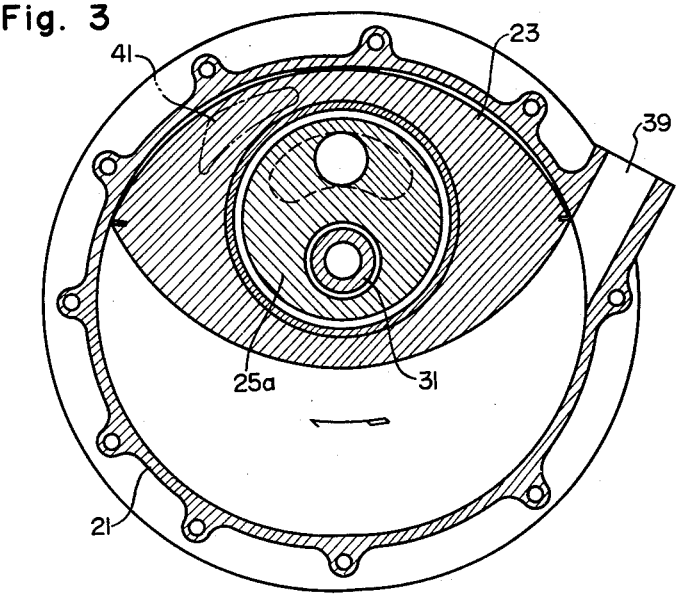
FIG. 3 is a cross section taken along the line B—B in FIG. 1.

There is shown an internal-combustion engine in the right-hand position of FIG. 1 and FIG. 2, a compressor being shown in the left-hand position of FIG. 1 and FIG. 3.

Referring to FIGS. 1 and 2, numeral 1 designates a housing having an inner peripheral wall of approximate double-lobe epitrochoidal configuration accommodating a rotor 3 having edges slidably contacting said inner wall. An eccentric shaft 5 extends through the center of the approximate epitrochoidal curve, and has an offset portion 5a rotatably carrying said rotor 3 through the intermediary of a bearing 7. A partition plate 11 is provided to which a gear 9 is secured coaxially with the crankshaft 5 in meshing engagement with an internal gear 13 attached to the rotor 3.

The ratio of the number of teeth of the gear 9 to that of the gear 13 is 2 to 3. Therefore, the rotor 3 is capable of making one-third revolution about its own axis during one complete revolution of the crankshaft 5 in the same direction as the latter. Numeral 15 in FIG. 2 designates a fresh air inlet opening formed in the partition or spacer plate 11. Numeral 17 designates a fuel injection valve; and 19, an exhaust port.

Referring next to FIGS. 1 and 3, numeral 21 designates a housing having an inner peripheral wall of approximate single-lobe epitrochoidal configuration accommodating a rotor 23 having edges slidably contacting said inner wall. A crankshaft 25 is journaled in the housing 21 coaxially with the crankshaft 5 of said internal-combustion engine so as to extend through the center of the curve of approximate epitrochoid. The crankshaft 25 has an offset portion 25a rotatably carrying a rotor 23 by way of a bearing 27. These crankshafts 5 and 25 are integrally connected with each other by the aid of a clamping bolt 29 with the offset portions 5a and 25a of the respective shafts held at an angular distance of 180 degrees from each other. A supporting rod 31 is secured to an adjacent side cover 33 coaxially with the crankshaft 25 to support the latter by way of a bearing 45 and is formed with a toothed portion 35, which is in mesh with an internal gear 37 secured to the rotor 23. The gear ratio between the gears 37 and 35 is 2 to 1. Therefore, the rotor 23 is rotatable about its own axis at half the speed of rotation of the crankshaft 25 in the same direction as the latter. In FIG. 3, numeral 39 designates a fresh air inlet opening; and 41, a fresh air feed opening formed in a side cover 43 of the engine and communicating with the fresh air inlet opening 15 in the partition plate 11 by way of a passage.

The arrow in FIGS. 2 and 3 indicates the direction of rotation of the crankshafts 5 and 25 and hence of the rotors 3 and 23.

The following is a description of the process of operation of the apparatus according to the present invention made with reference to FIGS. 4 to 11. In each of these figures, the internal-combustion engine is shown on the right-hand side and the compressor, on the left-hand side. For convenience's sake, description will be made on the basis of the operation of the working chamber $V_1$ of the compressor.

FIGS. 4 to 7, inclusive, show the process in which fresh air is drawn into the working chamber $V_1$ of the compressor now in communication with the fresh air inlet opening 39.

Figure 8:
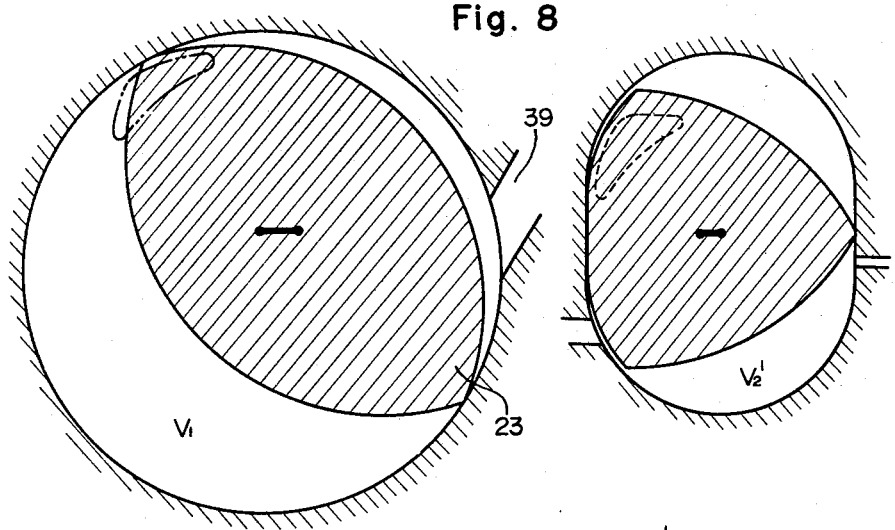
Figure 9:
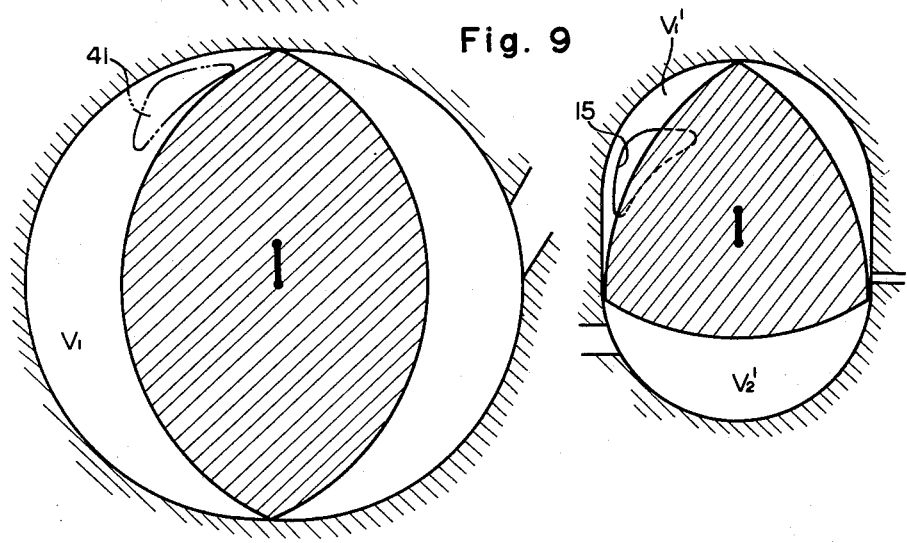
Figure 10:
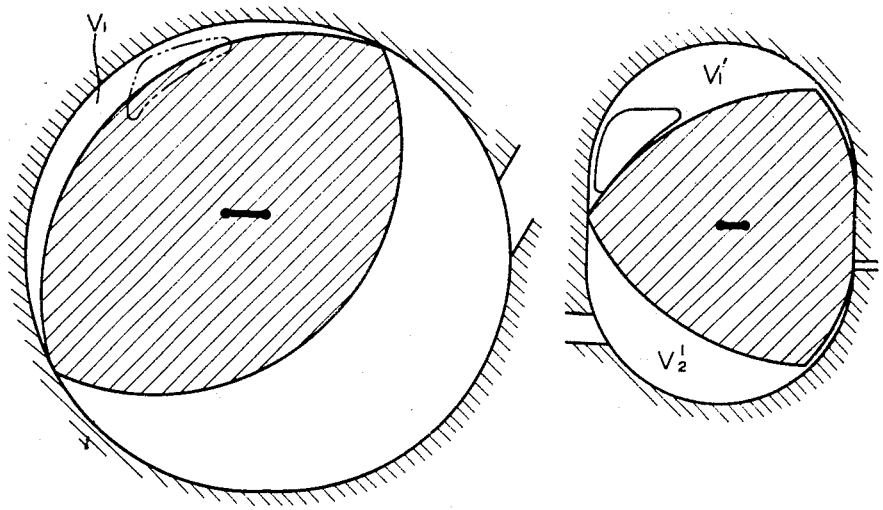

Referring to FIG. 8, the fresh air inlet opening 39 is closed to the working chamber $V_1$, which is being reduced in volume to compress the fresh air therein. In FIGS. 9 and 10, the working chamber $V_1$ of the compressor and the working chamber $V_1'$ of the internal-combustion engine are in communication with each other by way of the fresh air feed opening 41 and the fresh air inlet opening 15 allowing the fresh air to be forced out of the working chamber $V_1$ into the working chamber $V_1'$.

Figure 4:
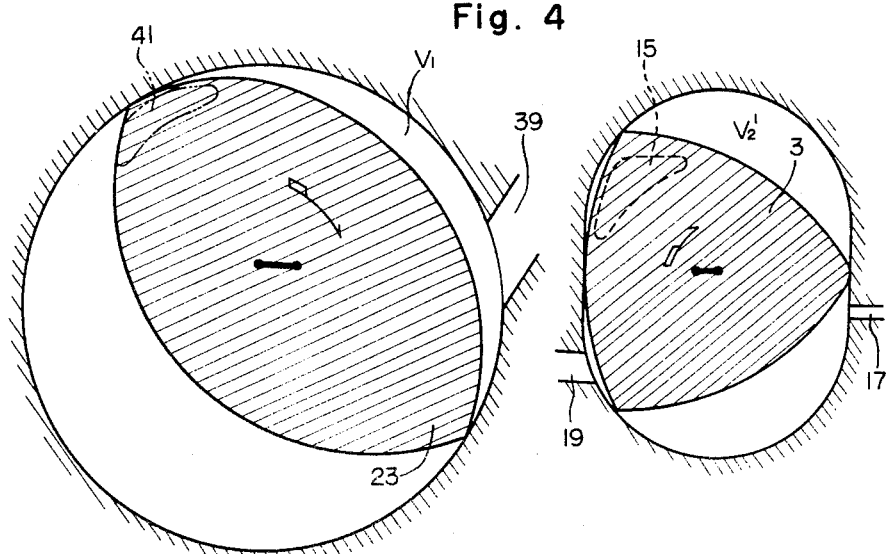
FIGS. 4 to 11 are schematic diagrams showing one pair of rotors of the engine in successive angular positions.
Figure 5:
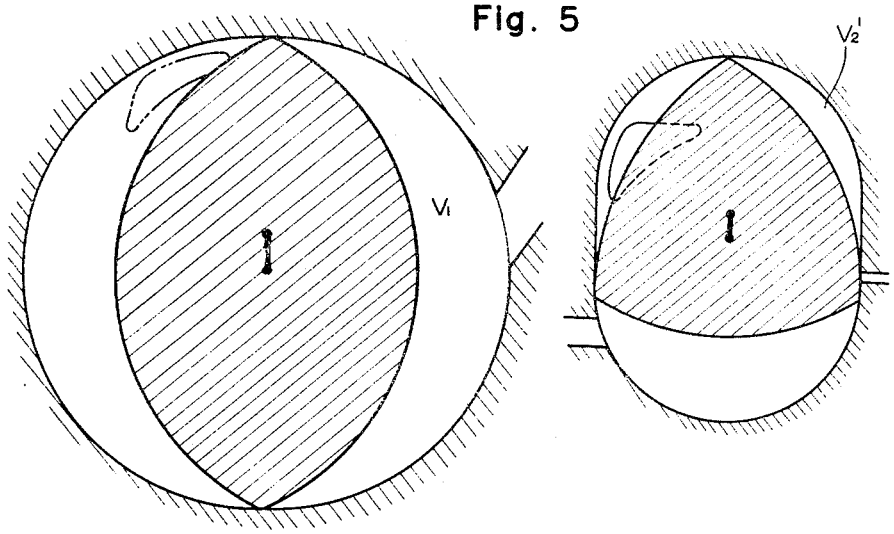
Figure 6:
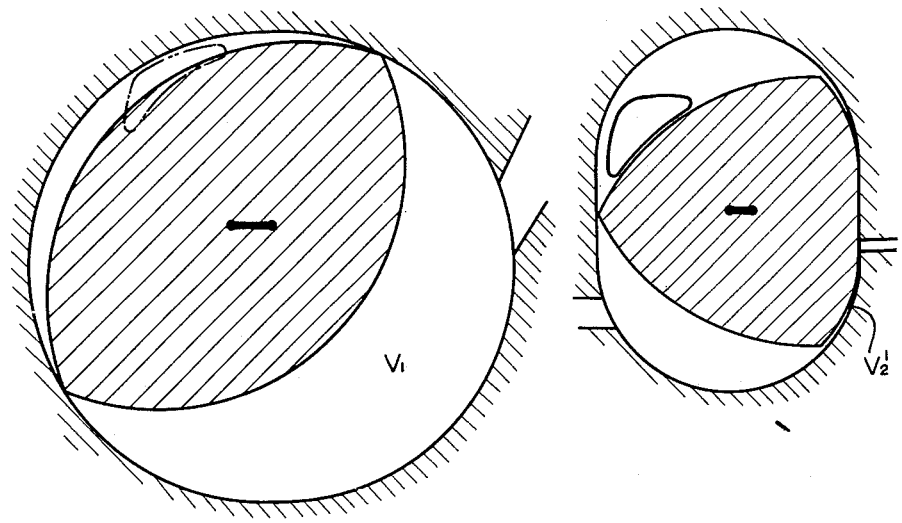
Figure 7:
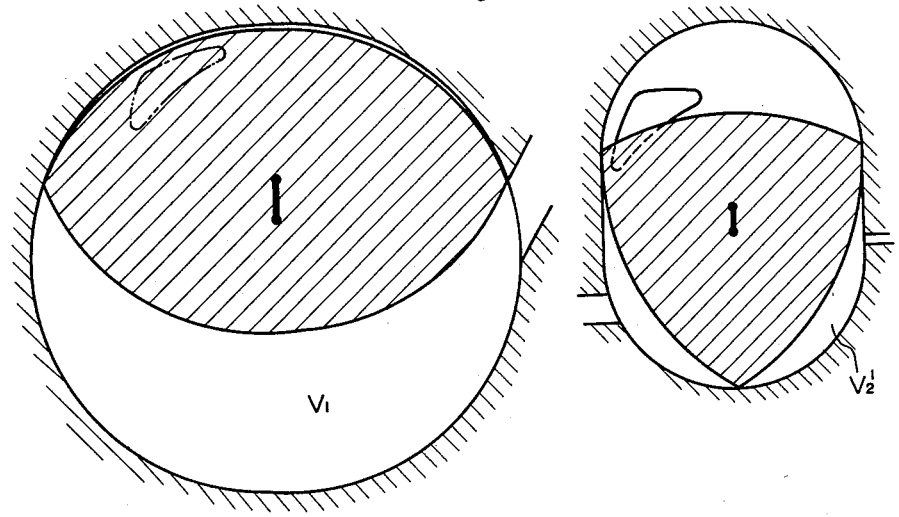
Figure 11:
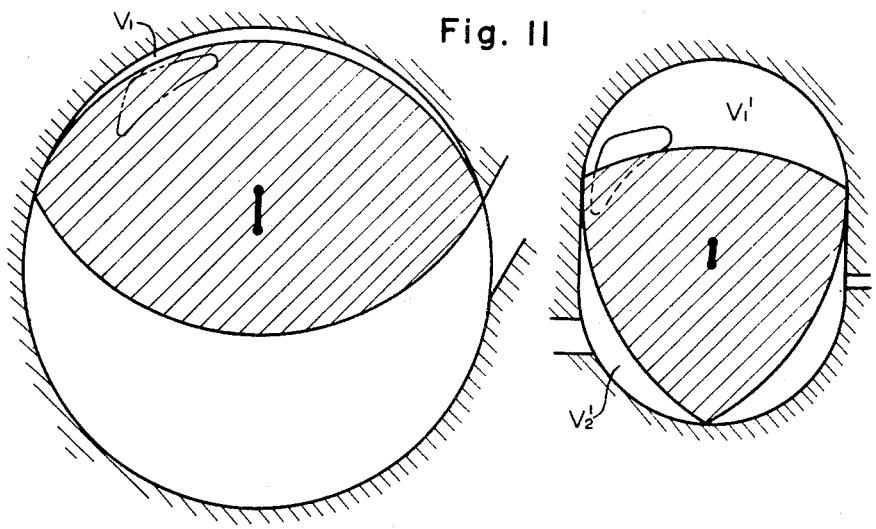

FIG. 11 corresponds to the stage when the forced delivery of the fresh air from the working chamber $V_1$ to $V_1'$ has just been completed. After this, the working chamber $V_1$ resumes the fresh air suction stroke as shown in FIG. 4 to follow the process described above. Meanwhile, the working chamber $V_1'$ of the internal combustion engine follows the same process as the next following working chamber $V_2'$ as shown in FIG. 4 and the following. That is, during the period corresponding to FIG. 4 and the following, the chamber $V_2'$ performs the ordinary four-stroke diesel cycle including compression of the air fed, fuel injection, explosion, expansion and exhaust.

By suitably selecting with the arrangement and construction described above the ratio of displacement of the working chamber of the compressor to that of the internal-combustion chamber, a desired compression ratio for the diesel cycle may be readily attained even with machines of lesser sizes.

Epitrochoidal type rotary compressors in general can readily obtain a high delivery pressure as compared with ordinary units which are made use of as blowers or compressors, such as Roots blowers or centrifugal compressors, and are very simple in construction as compared with reciprocating piston compressors.

Further, among rotary machines of the epitrochoidal type, single-lobe epitrochoidal machines are most suitable for the purpose as they have a displacement which is large for their structural volume and thus may be minimized in volume as an epitrochoidal rotary compressor having a desired capacity. Thus, the diesel type internal-combustion engine of the invention, being equipped with such compressor has a tidy and compact construction.

What is claimed is:

1. A rotary diesel engine comprising, in combination a fore compressor including a first housing having an inner peripheral wall surface of approximately single-lobe epitrochoidal configuration, a crankshaft journaled in said housing and having a first offset portion, a fusiform rotor mounted on said first offset portion for rotation on its own axis at half the speed of said crankshaft and having two edge portions slidably contacting said inner peripheral wall surface, intake and output openings in said first housing; and an internal-combustion engine being arranged coaxially and contiguous with said compressor and including a second housing having an inner peripheral wall surface of approximately double-lobe epitrochoidal configuration, a second crank shaft journaled in said second housing and having a second offset portion, both said crankshaft being integrally connected, a generally triangular rotor mounted on said second offset portion for rotation on its own axis at one-third the speed of rotation of said second crankshaft and having three edge portions slidably contacting said inner peripheral wall surface of the second housing, intake and exhaust openings in said second housing, said compressor output being connected to the inlet of the engine so that the air taken into the engine is compressed to a degree sufficient for effecting ignition of the fuel.

2. A rotary diesel engine comprising, in combination, a fore compressor including a first housing having an inner peripheral wall surface of approximately single-lobe epitrochoidal configuration, a first crankshaft journaled in said housing and having a first offset portion, a fusiform rotor mounted on said first offset portion for rotation on its own axis at half the speed of said crankshaft and having two edge portions slidably contacting said crankshaft and having two edge portions slidably contacting said inner peripheral wall surface intake and output openings in said first housing; and an internal-combustion engine arranged coaxially and contiguous with said compressor and including a housing having an inner peripheral wall surface of approximately double lobe epitrochoidal configuration, a second crankshaft journaled in said housing and having a second offset portion, a generally triangular rotor mounted on said second offset portion for rotation on its own axis at one-third the speed of rotation of said second crankshaft and having three edge portions slidably contacting said inner peripheral wall surface of the second housing intake and exhaust openings in said second housing, said crankshafts being integrally interconnected in axial alignment with each other with said offset portions arranged at an angular distance of 180 degrees from each other, said compressor output being connected directly to the intake of the engine so that the air taken into the engine is compressed to a degree sufficient for effecting ignition of the fuel.

References Cited by the Examiner

UNITED STATES PATENTS

| | | | |
|---|---|---|---|
| 1,275,619 | 8/1918 | Smiley | 123—8 |
| 1,617,863 | 2/1927 | Planche | 123—8 |
| 1,636,486 | 7/1927 | Planche | 123—8 |
| 1,686,569 | 10/1928 | McMillan | 123—8 |
| 1,792,026 | 2/1931 | Nichols | 123—8 |
| 1,802,887 | 4/1931 | Feyens | 123—8 |
| 2,075,561 | 3/1937 | Wellensiek | 123—8 |
| 2,511,441 | 6/1950 | Loubiere | 123—8 |
| 2,988,065 | 6/1961 | Wankel et al. | 123—8 |
| 2,993,482 | 7/1961 | Froede | 123—8 |
| 3,053,238 | 9/1962 | Meurer. | |
| 3,144,006 | 8/1964 | Meurer | 123—8 |

FOREIGN PATENTS

| | | |
|---|---|---|
| 1,287,176 | 1/1962 | France. |
| 893,325 | 4/1962 | Great Britain. |

OTHER REFERENCES

Anderson, J. W.: Diesel Engines, N.Y., McGraw-Hill Book Co., Inc., 1949, pp. 309, 310.

MARK NEWMAN, *Primary Examiner.*

JOSEPH H. BRANSON, JR., KARL, J. ALBRECHT, SAMUEL LEVINE, *Examiners.*

F. T. SADLER, *Assistant Examiner.*